United States Patent
Abotabl et al.

(10) Patent No.: US 11,832,284 B2
(45) Date of Patent: Nov. 28, 2023

(54) DISJOINT RESOURCE INDICATION FOR FULL-DUPLEX OPERATION

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 152 days.

(21) Appl. No.: 17/214,640

(22) Filed: Mar. 26, 2021

(65) Prior Publication Data

US 2021/0307014 A1    Sep. 30, 2021

Related U.S. Application Data

(60) Provisional application No. 63/003,062, filed on Mar. 31, 2020.

(51) Int. Cl.
| | | |
|---|---|---|
| *H04W 72/53* | (2023.01) | |
| *H04W 72/0453* | (2023.01) | |
| *H04L 1/1607* | (2023.01) | |
| *H04L 5/14* | (2006.01) | |
| *H04W 72/20* | (2023.01) | |

(52) U.S. Cl.
CPC ......... *H04W 72/53* (2023.01); *H04L 1/1614* (2013.01); *H04L 5/14* (2013.01); *H04W 72/0453* (2013.01); *H04W 72/20* (2023.01)

(58) Field of Classification Search
None
See application file for complete search history.

(56) References Cited

U.S. PATENT DOCUMENTS

| | | | | |
|---|---|---|---|---|
| 2020/0059906 | A1* | 2/2020 | Gupta | .......... H04L 5/0053 |
| 2020/0170016 | A1* | 5/2020 | Ji | ............ H04W 72/0453 |
| 2021/0250928 | A1* | 8/2021 | Seo | ............ H04W 72/042 |
| 2022/0173851 | A1* | 6/2022 | Shi | ............ H04L 5/0035 |
| 2022/0182160 | A1* | 6/2022 | Su | ............ H04L 27/2691 |
| 2022/0272744 | A1* | 8/2022 | Noh | ............ H04L 5/00 |

FOREIGN PATENT DOCUMENTS

KR     20190072380 A     6/2019

OTHER PUBLICATIONS

International Search Report and Written Opinion—PCT/US2021/070325—ISA/EPO—dated Jun. 22, 2021.

* cited by examiner

*Primary Examiner* — Saumit Shah
(74) *Attorney, Agent, or Firm* — Harrity & Harrity, LLP

(57) ABSTRACT

Various aspects of the present disclosure generally relate to wireless communication. In some aspects, a wireless node may receive a frequency domain resource assignment indicator identifying an allocation of a set of resource block groups of a plurality of resource block groups in a bandwidth part, wherein the bandwidth part includes a plurality of disjoint portions of the bandwidth part and the plurality of disjoint portions comprise an uplink bandwidth or a downlink bandwidth separated by another portion of the bandwidth part; identify, based at least in part on the frequency domain resource assignment indicator, the allocation of the set of resource block groups; and communicate using the allocation of the set of resource block groups based at least in part on identifying the allocation of the set of resource block groups. Numerous other aspects are provided.

30 Claims, 9 Drawing Sheets

DISJOINT RESOURCE INDICATION FOR FULL-DUPLEX OPERATION

CROSS-REFERENCE TO RELATED APPLICATION

This Patent Applications claims priority to U.S. Provisional Patent Application No. 63/003,062, filed on Mar. 31, 2020, entitled "DISJOINT RESOURCE INDICATION FOR FULL-DUPLEX OPERATION," and assigned to the assignee hereof. The disclosure of the prior Applications is considered part of and is incorporated by reference into this Patent Applications.

FIELD OF THE DISCLOSURE

Aspects of the present disclosure generally relate to wireless communication and to techniques and apparatuses for disjoint resource indication for full-duplex operation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a wireless node, may include receiving a frequency domain resource assignment indicator identifying an allocation of a set of resource block groups of a plurality of resource block groups in a bandwidth part, wherein the bandwidth part includes a plurality of disjoint portions of the bandwidth part and the plurality of disjoint portions comprise an uplink bandwidth or a downlink bandwidth separated by another portion of the bandwidth part; identifying, based at least in part on the frequency domain resource assignment indicator, the allocation of the set of resource block groups; and communicating using the allocation of the set of resource block groups based at least in part on identifying the allocation of the set of resource block groups.

In some aspects, a wireless node for wireless communication may include a memory and one or more processors coupled to the memory. The memory and the one or more processors may be configured to receive a frequency domain resource assignment indicator identifying an allocation of a set of resource block groups of a plurality of resource block groups in a bandwidth part, wherein the bandwidth part includes a plurality of disjoint portions of the bandwidth part and the plurality of disjoint portions comprise an uplink bandwidth or a downlink bandwidth separated by another portion of the bandwidth part; identify, based at least in part on the frequency domain resource assignment indicator, the allocation of the set of resource block groups; and communicate using the allocation of the set of resource block groups based at least in part on identifying the allocation of the set of resource block groups.

In some aspects, a non-transitory computer-readable medium may store one or more instructions for wireless communication. The one or more instructions, when executed by one or more processors of a wireless node, may cause the one or more processors to receive a frequency domain resource assignment indicator identifying an allocation of a set of resource block groups of a plurality of resource block groups in a bandwidth part, wherein the bandwidth part includes a plurality of disjoint portions of the bandwidth part and the plurality of disjoint portions comprise an uplink bandwidth or a downlink bandwidth separated by another portion of the bandwidth part; identify, based at least in part on the frequency domain resource assignment indicator, the allocation of the set of resource block groups; and communicate using the allocation of the set of resource block groups based at least in part on identifying the allocation of the set of resource block groups.

In some aspects, an apparatus for wireless communication may include means for receiving a frequency domain resource assignment indicator identifying an allocation of a set of resource block groups of a plurality of resource block groups in a bandwidth part, wherein the bandwidth part includes a plurality of disjoint portions of the bandwidth part and the plurality of disjoint portions comprise an uplink bandwidth or a downlink bandwidth separated by another portion of the bandwidth part; means for identifying, based at least in part on the frequency domain resource assignment indicator, the allocation of the set of resource block groups; and means for communicating using the allocation of the set of resource block groups based at least in part on identifying the allocation of the set of resource block groups.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
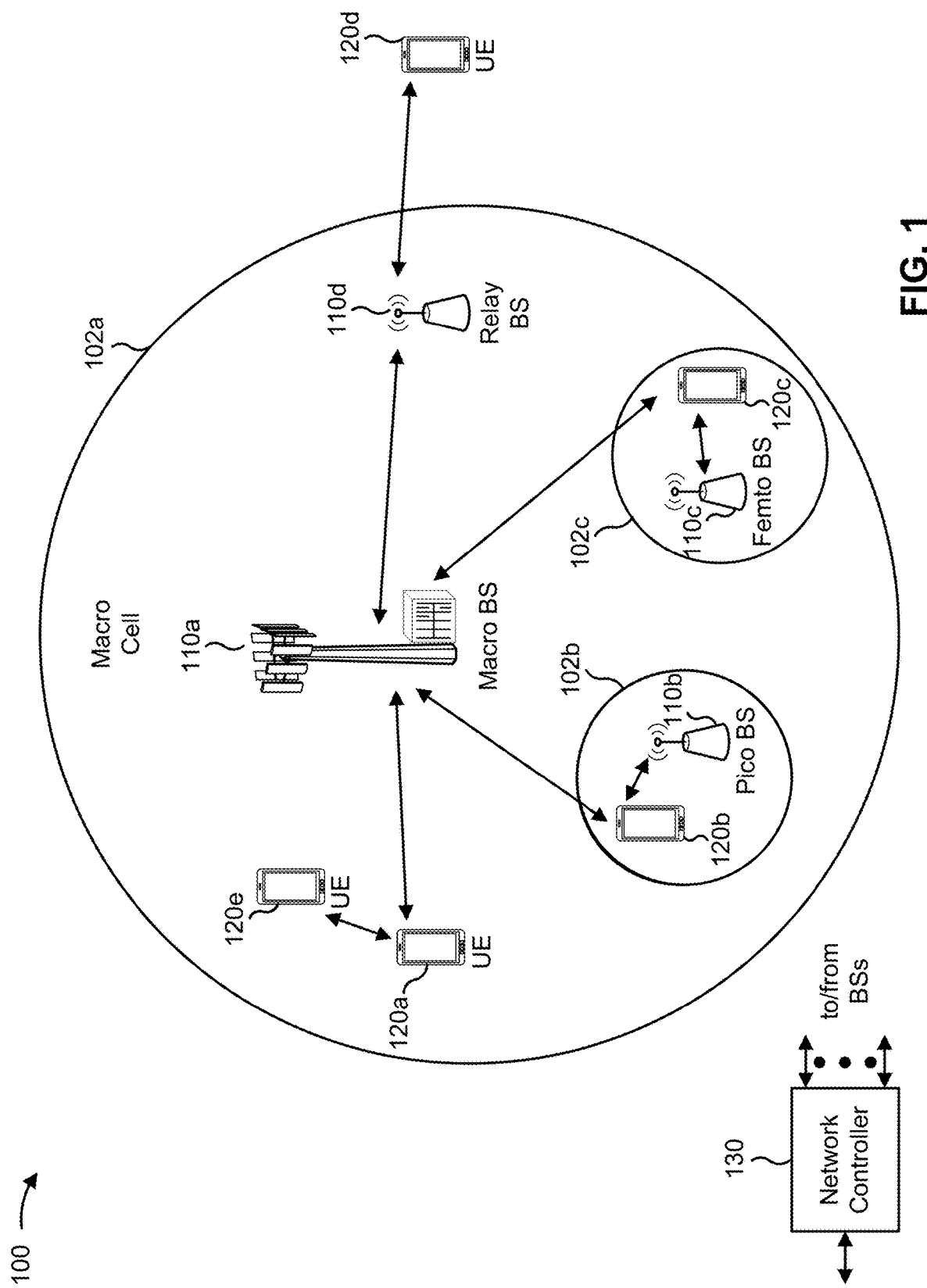
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave"

band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
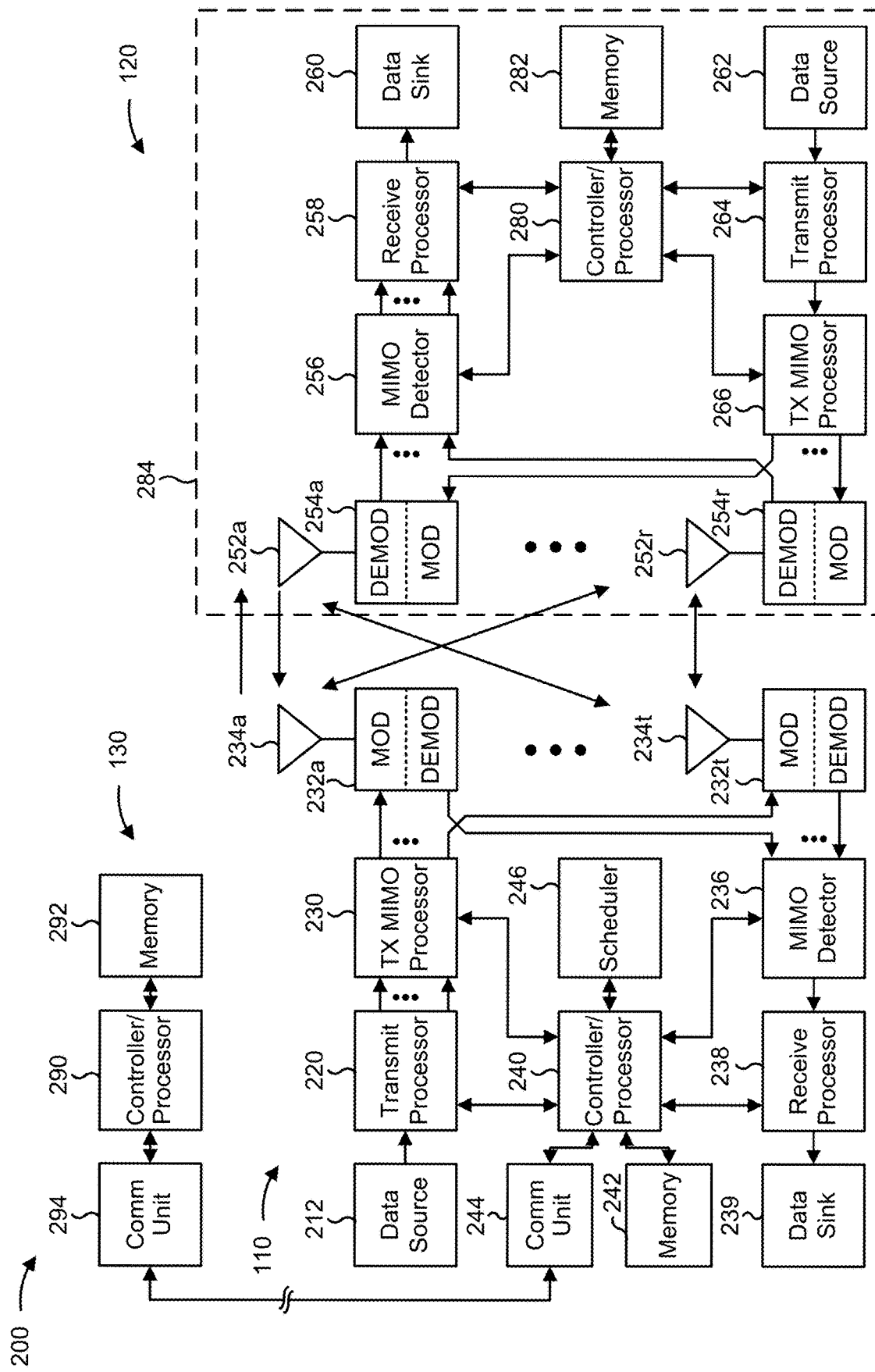
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 7-8.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 7-8.

A wireless node, which may include controller/processor 240 of base station 110, controller/processor 280 of UE 120, and/or any other component(s) of FIG. 2, may perform one or more techniques associated with disjoint resource indication for full-duplex operation, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8 and/or other processes as described herein. In some aspects, executing instructions may include running the instructions, converting the instructions, compiling the instructions, and/or interpreting the instructions, among other examples.

In some aspects, the wireless node includes means for receiving a frequency domain resource assignment indicator identifying an allocation of a set of resource block groups of a plurality of resource block groups in a bandwidth part, wherein the bandwidth part includes a plurality of disjoint portions of the bandwidth part and the plurality of disjoint portions comprise an uplink bandwidth or a downlink bandwidth separated by another portion of the bandwidth part; means for identifying, based at least in part on the frequency domain resource assignment indicator, the allocation of the set of resource block groups; or means for communicating using the allocation of the set of resource block groups based at least in part on identifying the allocation of the set of resource block groups. In some aspects, the means for the wireless node to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the wireless node to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the wireless node includes means for determining the common size based at least in part on a size of a first disjoint portion of the other of an uplink bandwidth or a downlink bandwidth or a size of a second disjoint portion of the other of the uplink bandwidth or the downlink bandwidth. In some aspects, the means for the wireless node to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the wireless node to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the wireless node includes means for determining at least one of the first size or the second size based at least in part on a resource block group size table. In some aspects, the wireless node includes means for determining at least one of the first size or the second size based at least in part on at least one stored bandwidth part configuration. In some aspects, the means for the wireless node to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the wireless node to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the wireless node includes means for determining at least one of the first size or the second size based at least in part on a resource block group size table that includes a non-full duplex operation or non-disjoint bandwidth part operation configuration and a full-duplex operation or disjoint bandwidth part operation configuration. In some aspects, the means for the wireless node to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the wireless node to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the wireless node includes means for determining at least one of the first size or the second size based at least in part on a resource block group size table that includes a full-duplex operation or disjoint bandwidth part operation configuration and not a non-full duplex operation or non-disjoint bandwidth part operation configuration. In some aspects, the means for the wireless node to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the wireless node to perform operations described herein may include, for example, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
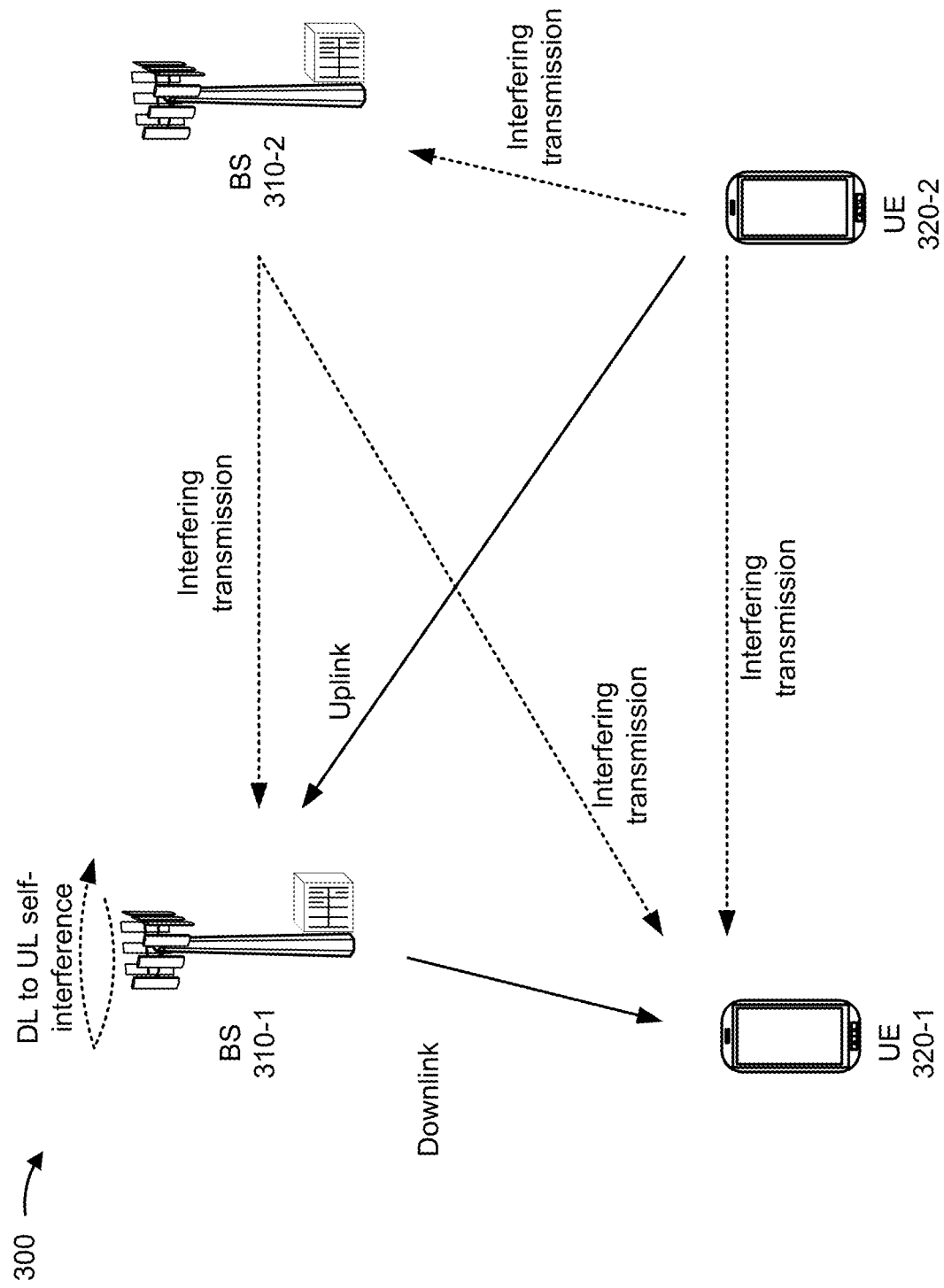
FIGS. 3-5 are diagrams illustrating examples of full-duplex operation modes, in accordance with the present disclosure.
Figure 4:
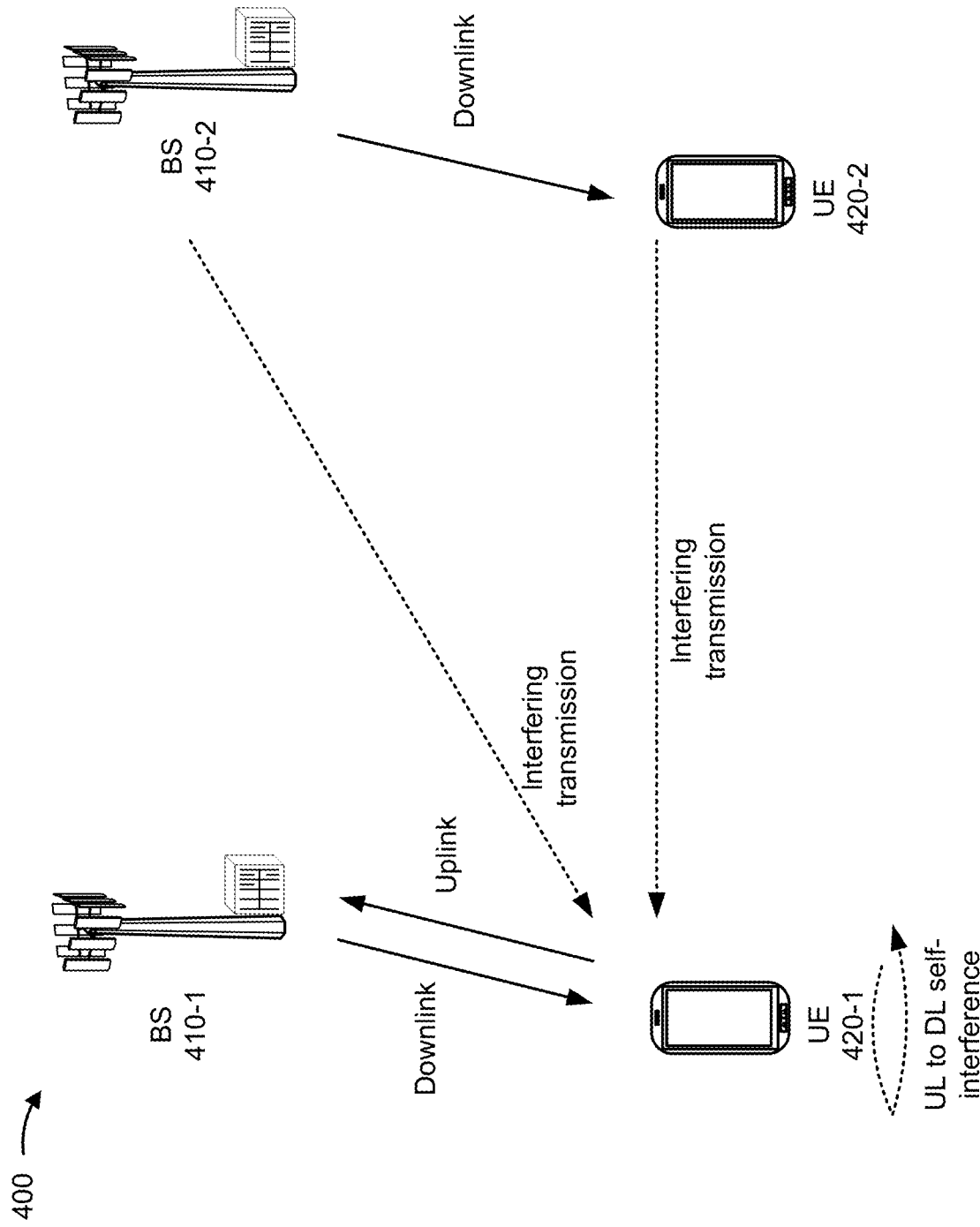
Figure 5:
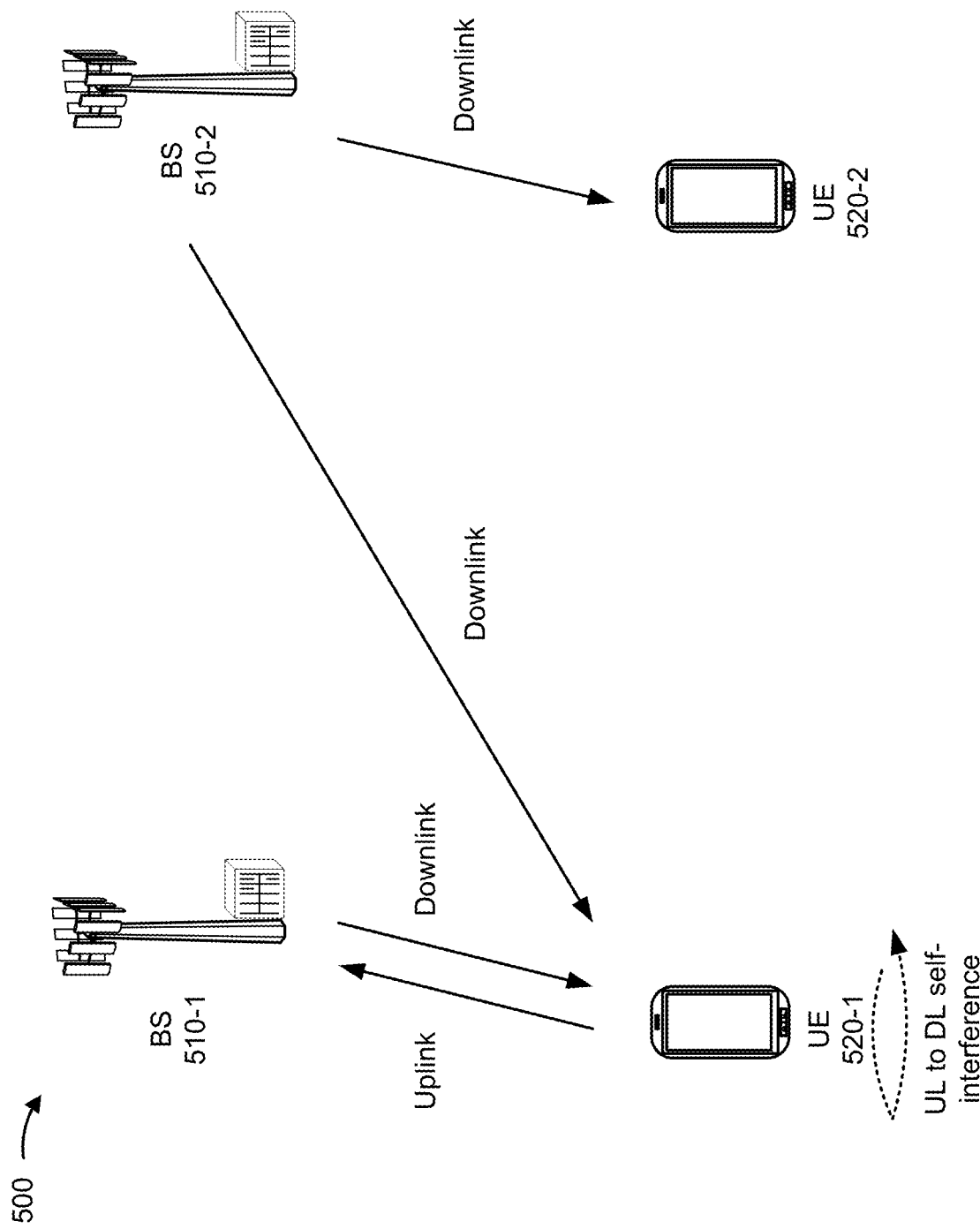

FIGS. 3-5 are diagrams illustrating one or more examples of full-duplex operation modes, in accordance with the present disclosure. A UE and a BS may communicate with each other using beams. For example, a beam may be a downlink beam (e.g., on which information may be conveyed from the BS to the UE) or an uplink beam (e. g, on which information may be conveyed from the UE to the BS). In some aspects, the UE and the BS may be integrated access backhaul (IAB) wireless nodes.

A communication link between a UE and a BS may be referred to as half-duplex when the communication link includes only one of an uplink or a downlink or full-duplex when the communication link includes an uplink and a downlink. A full-duplex communication link may provide increased scalability of data rates on the link in comparison to a half-duplex communication link. In a full-duplex communication link, different antenna elements, sub-arrays, or antenna panels of a wireless communication device may simultaneously or contemporaneously perform uplink and downlink communication.

Full-duplex communication may present certain challenges in comparison to half-duplex communication. For example, a wireless communication device (e.g., a UE, a BA, and/or a wireless node) may experience self-interference between an uplink beam and a downlink beam of a full-duplex link or between components of the wireless communication device. This self-interference may complicate the monitoring of reference signals to detect beam failure. Furthermore, self-interference, cross-correlation, and/or the like, may occur in a full-duplex communication link that may not occur in a half-duplex communication link. Additionally, a wireless communication device may experience interfering transmissions from other wireless communication devices (e.g., based at least in part on an angular spread of a beam transmitted by the other wireless communication devices) in the wireless network that may cause a beam failure (e.g., an uplink beam failure, a downlink beam failure, and/or the like)

As shown in FIG. 3, an example wireless network 300 includes a BS 310-1 operating in a full-duplex operation mode. The BS 310-1 may receive an uplink from a UE 320-2 and transmit a downlink to a UE 320-1. The UE-320-1 and the UE 320-2 may be operating in a half-duplex operation mode. The BS 310-1 may experience downlink to uplink self-interference based at least in part on the downlink transmitted to UE 320-1 and the uplink received from UE 320-2. Additionally, BS 310-1 may experience interfering transmissions from other wireless communication devices transmitting in the wireless network 300 (e.g., from a BS 310-2). Moreover, UE 320-1 interfering transmissions from other wireless communication devices transmitting in the wireless network 300 (e.g., from the UE 320-2, from the BS 310-2, and/or the like).

As shown in FIG. 4, an example wireless network 400 includes a UE 420-1 operating in a full-duplex operation mode. The UE 420-1 may transmit an uplink to a BS 410-1 and may receive a downlink from the BS 410-1. In some aspects, the BS 410-1 may be operating in a full-duplex operation mode. The UE 420-1 may experience uplink to downlink self-interference based at least in part on the uplink transmitted to the BS 410-1 and the downlink received from the BS 410-1. The wireless network 400 may include other wireless communication devices, such as a BS 410-2 and a UE 420-2. The BS 410-2 may transmit a downlink to the UE-420-2. The UE 420-1 may experience an interfering transmission based at least in part on the transmission of the BS 410-2 and/or the UE 420-1. For example, the downlink transmitted by the BS 410-2 may have an angular spread that may cause an interfering transmission to be received by the UE 420-1. Similarly, an uplink transmitted by the UE 420-2 may have an angular spread that may cause an interfering transmission to be received by the UE 420-1.

As shown in FIG. 5, an example wireless network 500 includes a UE 520-1 operating in a full-duplex operation mode. The UE 520-1 may transmit an uplink to a BS 510-1 and may receive a downlink from a BS 510-2. The UE 520-1 may include a multi transmission and reception (multi-TRP) architecture. The UE 520-1 may experience uplink to downlink self-interreference based at least in part on the uplink transmitted to the BS 510-1 and the downlink received from the BS 510-2. The BS 510-1 and the BS 510-2 may be operating in a half-duplex mode of operation. The BS 510-2 may transmit a downlink to a UE 520-2. In some aspects, the UE 520-1 may experience one or more interfering transmissions based at least in part on the transmissions of BS 510-1, BS 510-2, and/or UE 520-2.

As indicated above, FIGS. 3-5 are provided as examples. Other examples may differ from what is described with respect to FIGS. 3-5.

Figure 6:
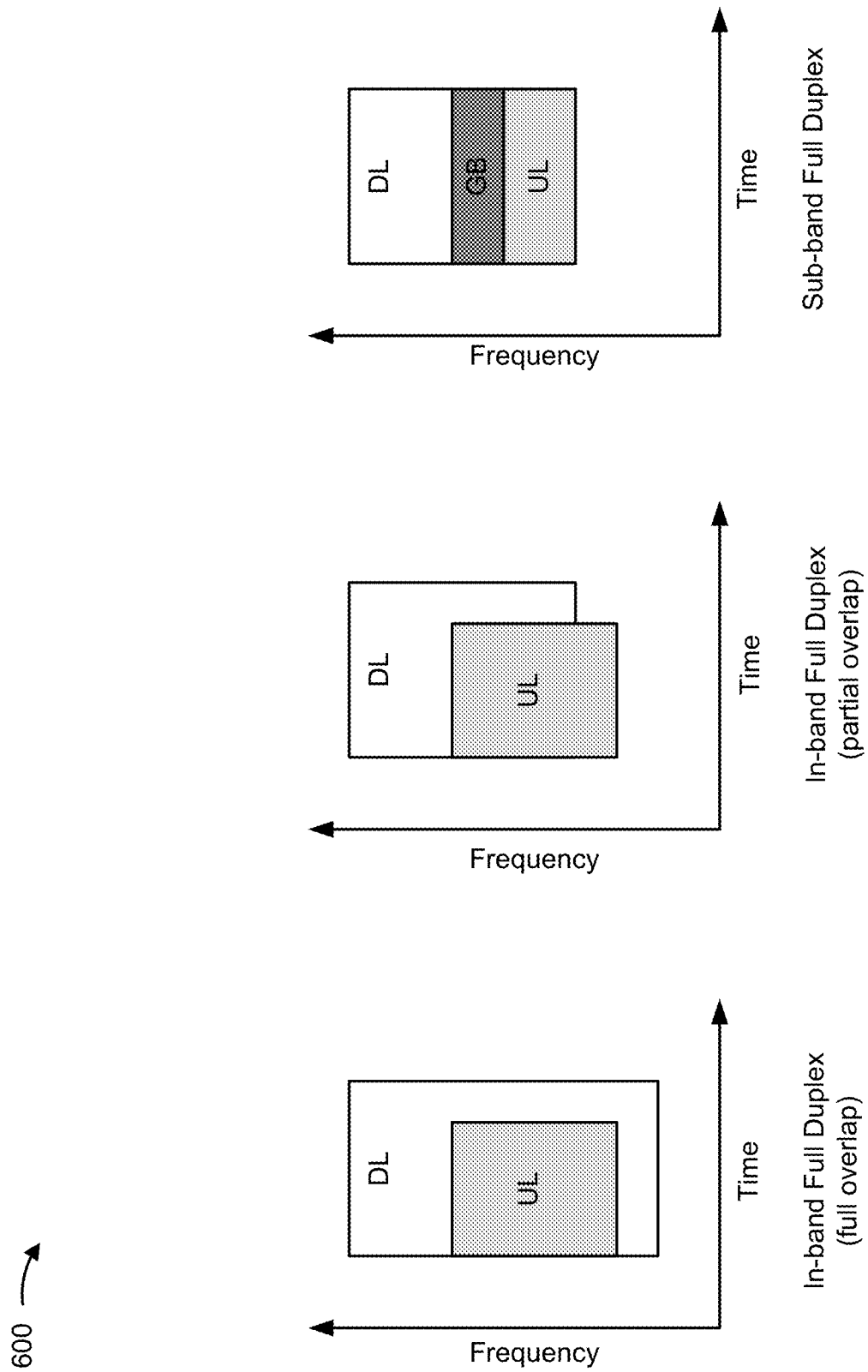
FIG. 6 is a diagram illustrating an example of full-duplex types, in accordance with the present disclosure.

FIG. 6 is a diagram illustrating one or more examples 600 of full-duplex types, in accordance with the present disclosure. As described above, full-duplex operation may involve communications having both an uplink (UL) and a downlink (DL) at the same time (e.g., transmit and receive at the same time). The uplink and downlink may share resources (e.g., time resources and/or frequency resources) associated with the communications.

As shown in FIG. 6, a full-duplex communication may be an in-band full duplex (IBFD) mode (e.g., a mode that includes an uplink and a downlink that share the same time resources and/or frequency resources). In some aspects, an IBFD mode may be a full overlap IBFD mode, such that the downlink resources may completely overlap the uplink resources (e.g., all of the uplink resources are shared with the downlink resources). In some aspects, a full overlap IBFD mode may have uplink resources that completely overlap the downlink resources. In some aspects, an IBFD communication may be a partial overlap IBFD mode, such that the downlink resources do not completely overlap the uplink resources (e.g., only some of the uplink resources are shared with the downlink resources).

In some aspects, a full-duplex mode may be a sub-band frequency division duplexing (FDD) mode (e.g., a mode that includes an uplink and a downlink that share the same time resources and use different frequency resources). In some aspects, the resources associated with the downlink and the resources associated with the uplink may be separated in the frequency domain by a guard band (GB) (e.g., a range of frequencies that are not allocated to the uplink or the downlink).

As indicated above, FIG. 6 is provided as an example. Other examples may differ from what is described with respect to FIG. 6.

A wireless communication standard or governing body may specify how a wireless spectrum is to be used. For example, 3GPP may specify how wireless spectrum is to be used for the 5G/NR radio access technology and interface. As an example, a specification may indicate whether a band is to be used as paired spectrum or unpaired spectrum. A band in a paired spectrum may use a first frequency region for uplink communication and a second frequency region for downlink communication, where the first frequency region does not overlap the second frequency region. For example, a paired band may have an uplink operating band and a downlink operating band that are configured to use non-overlapped frequency regions. Some deployments may use FDD in the paired bands. Examples of paired bands in NR include NR operating bands n1, n2, n3, n5, n7, n8, n12, n20, n25, and n28, as specified by 3GPP Technical Specification (TS) 38.101-1.

An unpaired band may allow downlink and uplink operations within a same frequency region (e.g., a same operating band). For example, an unpaired band may configure an uplink operating band and a downlink operating band in the same frequency range. Some deployments may use time division duplexing (TDD) in the unpaired band, where some time intervals (e.g., slots, sub-slots, and/or the like) are used for uplink communications and other time intervals are used for downlink communications. In this case, substantially the entire bandwidth of a component carrier may be used for a downlink communication or an uplink communication, depending on whether the communication is performed in a downlink slot, an uplink slot, or a special slot (in which downlink or uplink communications can be scheduled). Examples of unpaired bands include NR operating bands n40, n41, and n50, as specified by 3GPP TS 38.101-1.

In some cases, it may be inefficient to use TDD in an unpaired spectrum. For example, uplink transmit power may be limited, meaning that UEs may not be capable of transmitting with enough power to efficiently utilize the full bandwidth of an uplink slot. This may be particularly problematic in large cells at the cell edge. Furthermore, the usage of TDD may introduce latency relative to a scheme in which uplink communications and downlink communications can be performed in the same time interval, since a given time interval may be used for only uplink communication or for only downlink communication using TDD. However, frequency domain resource assignment (FDRA) for a bandwidth part (BWP) in the case of FDD in an unpaired spectrum may be problematic due to a gap between a first frequency region of the FDRA and a second frequency region of the FDRA (e.g., due to the BWP being disjointed).

Some techniques and apparatuses described herein provide disjoint resource indication for full-duplex operation. For example, a wireless node may receive an FDRA indicator identifying an allocation of a set of resource block groups (RBGs) of a plurality of RBGs in a BWP that is disposed between disjoint portions of the BWP. The wireless node may identify, based at least in part on the FDRA indicator, the allocation of the set of RBGs and may communicate using the allocation of the set of RBGs. In this way, the wireless node may communicate using a disjointed BWP in full-duplex in an unpaired spectrum. Thus, spectral efficiency in unpaired bands may be improved, particularly in large cells and at the cell edge. Furthermore, latency may be reduced on unpaired bands relative to a TDD configuration.

Figure 7:
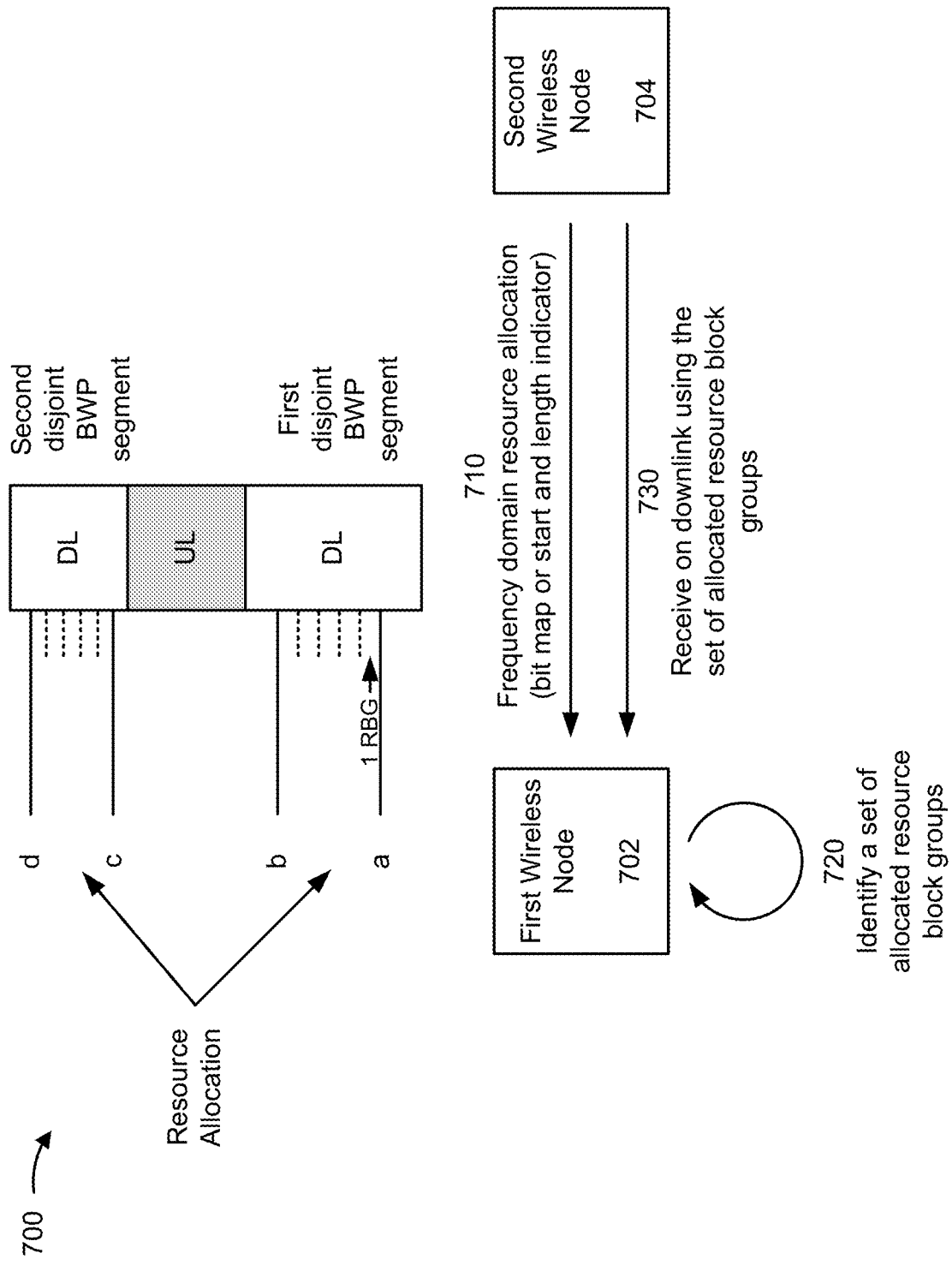
FIG. 7 is a diagram illustrating an example associated with disjoint resource indication for full-duplex operation, in accordance with the present disclosure.

FIG. 7 is a diagram illustrating an example 700 of disjoint resource indication for full-duplex operation. As shown in FIG. 7, example 700 may include a first wireless node 702 and a second wireless node 704. The first wireless node 702 and the second wireless node 704 may be IAB wireless nodes, UEs, BSs, and/or the like.

As shown by reference number 710, the first wireless node 702 may receive an FDRA from the second wireless node 704. For example, the FDRA may be identified in a downlink control information (DCI) field. The DCI may be formatted according to a technical standard, such as 3GPP TS 38.212 V 15 (e.g., format 0_1 for scheduling a physical uplink shared channel (PUSCH), formation 1_0 for scheduling a physical downlink shared channel (PDSCH), and/or the like).

In some aspects, the FDRA received by the first wireless node 702 may include an FDRA indicator identifying an allocation of a set of RBGs of a plurality of RBGs in a BWP. As shown in FIG. 7, the BWP may include a UL bandwidth and a DL bandwidth. In some aspects, the BWP may be a disjointed BWP, such that the UL bandwidth and/or the DL bandwidth may be disjointed in the frequency domain. For example, as shown in FIG. 7, the DL bandwidth may be disjointed such that a time interval of the BWP includes a first disjoint DL segment in a first frequency region and a second disjoint DL segment in a second frequency region with a UL segment between the first and second disjoint DL segments (e.g., such that the first frequency region and the second frequency region are separated by a frequency region associated with the UL segment). In some aspects, the disjointed DL bandwidth may include more than two disjoint DL segments. In some aspects, the UL bandwidth may be disjointed in a similar manner as described above. In some aspects, a disjointed BWP may include a disjointed DL bandwidth and a disjointed UL bandwidth (e.g., having a disjointed DL BWP and a disjointed UL BWP). In some aspects, another type of resource allocation may be disposed in a frequency region separating disjoint bandwidths of the BWP. For example, the BWP may include a pair of downlink bandwidths separated by a guard band or another type of resource allocation.

In some aspects, the FDRA indicator may include a bit map identifying the allocation of the set of RBGs in the BWP. Each bit of the bit map may correspond to an RBG of the plurality of RBGs in the BWP. Each bit of the bit map may identify if an RBG associated with the bit is allocated in the FDRA. For example, if the bit is assigned a value of '0', the bit may identify that the RBG associated with the bit is not allocated. If the bit is assigned a value of '1', the bit may identify that the RBG associated with the bit is allocated.

For example, the BWP may include a plurality of RBGs (e.g., from 'a' to 'd' as shown in FIG. 7). The frequency range from 'a' to 'd' may be an active BWP. The first wireless node 702 may identify the active BWP (e.g., based on an indication received by the first wireless node 702, a configuration associated with the first wireless node 702, and/or the like). In some aspects, the first wireless node 702 may identify an active bandwidth associated with the DL bandwidth and/or the UL bandwidth (e.g., the first wireless node 702 may identify the active DL bandwidth as between 'a' and 'b' and between 'c' and 'd', but not between 'b' and 'c').

In some aspects, the size of the bit map may correspond to the number of RBGs in the active BWP (e.g., from 'a' to 'd'). For example, the bit map may include one bit for each RBG in the active BWP. The bit map may indicate a value of '0' for all bits not in the active bandwidth associated with the DL bandwidth and/or the UL bandwidth (e.g., each bit between 'b' and 'c' may be assigned a value of '0', indicating that the RBGs associated with the bits between 'b' and 'c' are not allocated in the BWP). The bit map indicate a value of '1' or '0' for each bit in the active bandwidth associated with the DL bandwidth and/or the UL bandwidth (e.g., each bit between 'a' and 'b' and each bit between 'c' and 'd' for the DL bandwidth), based at least in part on whether the RBG associated with the bit is allocated in the BWP.

In some aspects, the FDRA indicator may include the bit map and a break point identifier dividing the bit map into a first subset of bits of the bit map and a second subset of bits of the bit map. The break point identifier may be associated with the active bandwidth associated with the DL bandwidth and/or the UL bandwidth that is disjointed. For example, the break point identifier may indicate that each bit in the first subset of the bits of the bit map correspond to the RBGs between 'a' and 'b' and that the second subset of the bits of the bit map correspond to the RBGs between 'c' and 'd'.

In some aspects, the size of the bit map may correspond to the number of RBGs from 'a' to 'b' and the number of RBGs from 'c' to 'd'. In some aspects, the number of bits associated with the first disjoint segment of the BWP (e.g., from 'a' to 'b') may be different than the number of bits associated with the second disjoint segment of the BWP (e.g., from 'c' to 'd'). For example, the number of bits corresponding to the first disjoint segment of the BWP may be 10 bits. The number of bits corresponding to the second disjoint segment of the BWP may be 5 bits. As such, in that case, the total size of the bit map may be 15 bits. The break point identifier may indicate to the first wireless node 702 that the first 10 bits of the bit map correspond to the first disjoint segment of the BWP and the remaining bits (e.g., the next 5 bits) of the bit map correspond to the second disjoint segment of the BWP. In this way, the bit map may not need to include bits corresponding to each RBG of the active BWP (e.g., from 'a' to d').

In some aspects, the FDRA indicator may include a first bit map identifying a first portion of the allocation of the set of RBGs corresponding to the first disjoint segment of the BWP (e.g., from 'a' to 'b'). The FDRA indicator may include a second bit map identifying a second portion of the allocation of the set of RBGs corresponding to the second disjoint segment of the BWP (e.g., from 'c' to 'd'). In this case, the size of the first bit map may correspond to the number of RBGs in the first disjoint segment and the size of the second bit map may correspond to the number of RBGs in the second disjoint segment. The size of the first bit map and/or the second bit map may depend on the RBG size in each segment of the BWP (e.g., the first disjoint segment and the second disjoint segment), as explained below.

In some aspects, the first wireless node 702 may determine a size associated with the plurality of RBGs in the BWP based at least in part on the size of the BWP and/or based at least in part on a stored BWP configuration. For example, an RBG size may be determined using an RBG size table, such as table 5.1.2.2.1-1 of 3GPP TS 38.214 Version 15.3.0 Release 15. For example, the RBG size table may indicate a first BWP configuration and a second BWP configuration. The RBG size table may indicate that for a BWP size between 1 and 36 resource blocks (RBs) the RBG size is 2 RBs for the first BWP configuration and 4 RBs for the second BWP configuration. The number of RBGs in a BWP may be determined by dividing the size of the BWP by the number of RBs in each RBG. For example, for the BWP size of 1-36, the number of RBGs in the first BWP configuration is 18 RBGs (e.g., 36 divided by 2) and the number of RBGs in the second BWP configuration is 9 RBGs (e.g., 36 divided by 4). In this way, the first wireless node 702 may determine the number of RBGs for each BWP based at least in part on the size of the BWP and/or based at least in part on the BWP configuration. As described above, the size of a bit map included in an FDRA indicator may correspond to the number of RBGs in the BWP (e.g., if the BWP includes 9 RBGs the bit map may include 9 bits).

In some aspects, the size of each RBG of the plurality of RBGs included in the BWP may be associated with a common size. For example, each RBG from 'a' to 'd' in the BWP may be the same size. In that case, the first wireless node 702 may determine the size of each RBG based at least in part on the size of one of the disjoint segments of the BWP. For example, the first wireless node 702 may determine the size of each RBG based at least in part on the size of the first disjoint segment of the BWP or the size of the second disjoint segment of the BWP in a similar manner as described above. As each RBG of the plurality of RBGs included in the BWP may be associated with a common size, the size of the RBGs in the first disjoint segment may be the same as the size of the RBGs in the second disjoint segment. Therefore, the first wireless node 702 may determine the size of each RBG in the disjoint BWP based at least in part on the size of the first disjoint segment of the BWP or the size of the second disjoint segment of the BWP and/or based at least in part on a BWP configuration using the RBG size table.

In some aspects, a first one or more resource block groups, of the plurality of resource block groups, is associated with a first size and a second one or more resource block groups, of the plurality of resource block groups, is associated with a second size that is different from the first size. For example, RBGs included in the first disjoint segment of the BWP may be associated with a first size and RBGs included in the second disjoint segment of the BWP may be associated with a second size.

In some aspects, the first wireless node 702 may determine the first size and the second size separately in a manner similar to that described above. For example, the first wireless node 702 may determine the first size based at least in part on the size of the first disjoint segment of the BWP and/or based at least in part on the BWP configuration using the RBG size table. The first wireless node 702 may determine the second size based at least in part on the size of the second disjoint segment of the BWP and/or based at least in part on the BWP configuration using the RBG size table as described above.

In some aspects, the first wireless node 702 may determine the first size and the second size based at least in part on a modified RBG size table. The modified RBG size table may include configurations that are non-full duplex operation or non-disjoint BWP operation configurations (e.g., the first BWP configuration and the second BWP configuration) and one or more full-duplex operation or disjoint bandwidth part operation configurations (e.g., new BWP configurations). The first wireless node 702 may determine the first size and the second size based at least in part on the modified RBG size table in a similar manner as described above.

In some aspects, the first wireless node 702 may determine the first size and the second size based at least in part on a new RBG size table. The new RBG size table may include the one or more full-duplex operation or disjoint bandwidth part operation configurations (e.g., new BWP configurations). The new RBG size table may not include BWP configurations that are non-full duplex operation or non-disjoint BWP operation configurations (e.g., the first BWP configuration and the second BWP configuration). The first wireless node 702 may determine the first size and the second size based at least in part on the new RBG size table in a similar manner as described above.

In this way, the first wireless node 702 may identify the size of a bit map(s) associated with the disjointed BWP as the number of RBGs in each segment of the disjointed BWP may corresponded to the number of bits in the bit map. For example, if the first wireless node 702 determines that there are 18 RBGs in the first disjoint segment of the BWP, the first wireless node 702 may identify that 18 bits of the bit map(s) may be associated with the first disjoint segment of the BWP. Similarly, if the first wireless node 702 determines that there are 9 RBGs in the second disjoint segment of the BWP, the first wireless node 702 may identify that 9 bits of the bit map(s) may be associated with the second disjoint segment of the BWP.

In some aspects, the FDRA indicator may include at least one of a start indicator or a length indicator identifying the allocation of the set of resource block groups. The start indicator may indicate the first RBG included in the allocation and the length indicator may indicate the number of RBGs included in the allocation. In some aspects, the length indicator may indicate the number of consecutive RBGs included in the allocation after the first RBG (e.g., indicated by the start indicator). In some aspects, the start indicator and the length indicator may be combined into a resource indicator value. The FDRA indicator may include one or more resource indicator values.

In some aspects, the FDRA indicator may include a first resource indicator value and a second resource indicator value. The first resource indicator value may identify a first start indicator and a first length indicator associated with the first disjoint segment of the BWP. The second resource indicator value may indicate a second start indicator and a second length indicator associated with the second disjoint segment of the BWP. As such, the first resource indicator value may indicate one or more allocated RBGs in the first disjoint segment of the BWP and the second resource indicator value may indicate one or more allocated RBGs in the second disjoint segment of the BWP.

In some aspects, the FDRA indicator may include one resource indicator value (e.g., indicating a start indicator and a length indicator). In some aspects, a start of a set of allocated RBGs (e.g., indicated by the start indicator) and an end of the set of allocated RBGs (e.g., indicated by the length indicator) may be in the same disjoint segment of the BWP (e.g., the start and the end of the set of allocated RBGs may both be in the first disjoint segment of the BWP or the start and the end of the set of allocated RBGs may both be in the second disjoint segment of the BWP). In that case, the set of allocated RBGs may be contiguous from the start indicated by the start indicator to the end indicated by the length indicator.

In some aspects, a start of a set of allocated RBGs (e.g., indicated by the start indicator) and an end of the set of allocated RBGs (e.g., indicated by the length indicator) may be in different disjoint segments of the BWP (e.g., the start of the set of allocated RBGs may be in the first disjoint segment of the BWP and the end of the set of allocated RBGs may be in the second disjoint segment of the BWP). In that case, the set of allocated RBGs may include a first subset of the set of allocated RBGs from the start indicated by the start indicator to the end of the first disjoint segment of the BWP (e.g., from the start to 'b'). The set of allocated RBGs may include a second subset of the set of allocated RBGs from a start of the second disjoint segment of the BWP to the end indicated by the length indicator (e.g., from 'c' to the end).

In some aspects, the FDRA indicator may include a start indicator (e.g., indicating a start of a set of allocated RBGs) and an end indicator (e.g., indicating an end of a set of allocated RBGs). The start indicator and the end indicator may indicate that all of the RBGs between the start and the end are allocated RBGs. In some aspects, a set of allocated RBGs (e.g., indicated by the start indicator and the end indicator) may be in different disjoint segments of a BWP, in a similar manner as described above.

In some aspects, the FDRA indicator may include an end indicator (e.g., indicating an end of a set of allocated RBGs) and a length indicator (e.g., indicating the number of consecutive RBGs included in the allocation before the last RBG (e.g., indicated by the end indicator)). In some aspects, a set of allocated RBGs (e.g., indicated by the end indicator and the length indicator) may be in different disjoint segments of a BWP, in a similar manner as described above.

As shown in FIG. 7, and by reference number 720, the first wireless node 702 may identify the set of allocated RBGs based at least in part on the FDRA indicator. For example, the first wireless node 702 may identify the set of allocated RBGs based at least in part on one or more bit maps. In some aspects, the first wireless node 702 may identify the set of allocated RBGs based at least in part on a start indicator and a length indicator of the set of allocated RBGs.

As shown by reference number 730, the first wireless node 702 may receive on a downlink using the set of allocated RBGs. In some aspects, the disjoint BWP may be associated with an uplink. In that case, the first wireless node 702 may transmit on the uplink using the set of allocated RBGs.

In this way, the first wireless node 702 may communicate using a disjointed BWP in full-duplex in an unpaired spectrum. As such, spectral efficiency in unpaired bands may be improved, particularly in large cells and at the cell edge. Furthermore, latency may be reduced on unpaired bands relative to a TDD configuration.

As indicated above, FIG. 7 is provided as an example. Other examples may differ from what is described with respect to FIG. 7.

Figure 8:
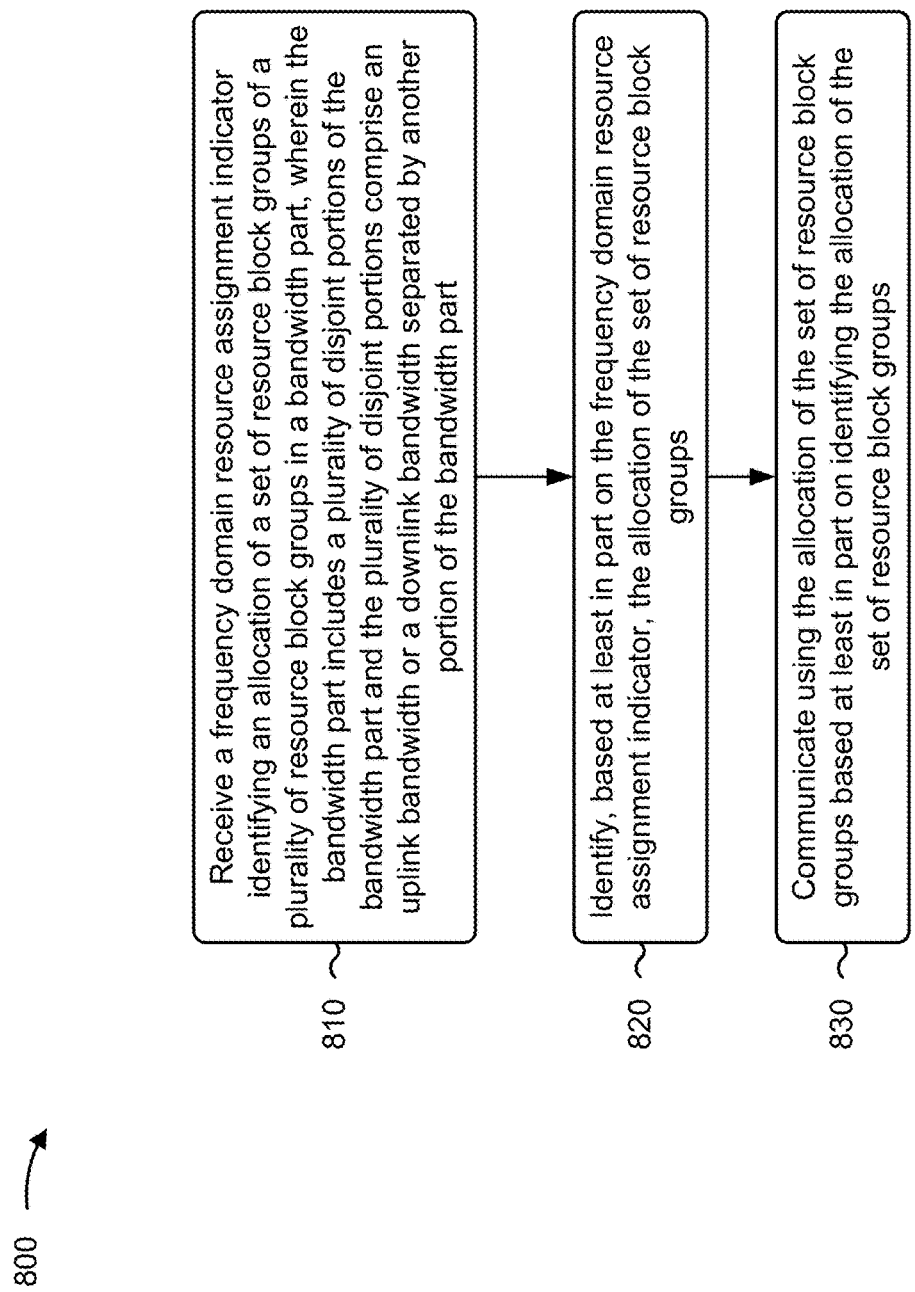
FIG. 8 is a diagram illustrating an example process associated with disjoint resource indication for full-duplex operation, in accordance with the present disclosure.

FIG. 8 is a diagram illustrating an example process 800 performed, for example, by a wireless node, in accordance with the present disclosure. Example process 800 is an example where the wireless node (e.g., the first wireless node 702, the second wireless node 704, and/or the like) performs operations associated with disjoint resource indication for full-duplex operation.

As shown in FIG. 8, in some aspects, process 800 may include receiving a frequency domain resource assignment indicator identifying an allocation of a set of resource block groups of a plurality of resource block groups in a bandwidth part, wherein the bandwidth part includes a plurality of disjoint portions of the bandwidth part and the plurality of disjoint portions comprise an uplink bandwidth or a downlink bandwidth separated by another portion of the bandwidth part (block 810). For example, the wireless node (e.g., using antenna 234, DEMOD 232, MIMO detector 236, receive processor 238, controller/processor 240, antenna 252, DEMOD 254, MIMO detector 256, receive processor 258, controller/processor 280, and/or the like) may receive a frequency domain resource assignment indicator identifying an allocation of a set of resource block groups of a plurality of resource block groups in a bandwidth part, as described above. In some aspects, the bandwidth part includes a plurality of disjoint portions of the bandwidth part and the plurality of disjoint portions comprise an uplink bandwidth or a downlink bandwidth separated by another portion of the bandwidth part.

As further shown in FIG. 8, in some aspects, process 800 may include identifying, based at least in part on the frequency domain resource assignment indicator, the allocation of the set of resource block groups (block 820). For example, the wireless node (e.g., using controller/processor 240, controller/processor 280, and/or the like) may identify, based at least in part on the frequency domain resource assignment indicator, the allocation of the set of resource block groups, as described above.

As further shown in FIG. 8, in some aspects, process 800 may include communicating using the allocation of the set of resource block groups based at least in part on identifying the allocation of the set of resource block groups (block 830). For example, the wireless node (e.g., using antenna 234, DEMOD 232, MIMO detector 236, receive processor 238, controller/processor 240, transmit processor 220, TX MIMO processor 230, MOD 232, antenna 252, DEMOD 254, MIMO detector 256, receive processor 258, controller/processor 280, transmit processor 264, TX MIMO processor 266, MOD 254, and/or the like) may communicate using the allocation of the set of resource block groups based at least in part on identifying the allocation of the set of resource block groups, as described above.

Process 800 may include additional aspects, such as any single aspect or any combination of aspects described below and/or in connection with one or more other processes described elsewhere herein.

In a first aspect, the bandwidth part includes an uplink bandwidth and a downlink bandwidth.

In a second aspect, alone or in combination with the first aspect, the frequency domain resource assignment indicator includes a bit map identifying the allocation of the set of resource block groups.

In a third aspect, alone or in combination with one or more of the first and second aspects, each bit of the bit map corresponds to a resource block group of the plurality of resource block groups.

In a fourth aspect, alone or in combination with one or more of the first through third aspects, the frequency domain resource assignment indicator includes a break point identifier dividing the bit map into a first subset of bits of the bit map and a second subset of bits of the bit map, and the first subset of bits corresponds to a first subset of the plurality of resource block groups in a first disjoint portion of the other of the uplink bandwidth or the downlink bandwidth and the second subset of bits of the bit map corresponds to a second subset of the plurality of resource block groups in a second disjoint portion of the other of the uplink bandwidth or the downlink bandwidth.

In a fifth aspect, alone or in combination with one or more of the first through fourth aspects, the frequency domain resource assignment indicator includes a first bit map identifying a first portion of the allocation of the set of resource block groups in a first disjoint portion of the other of the uplink bandwidth or the downlink bandwidth and a second bit map identifying a second portion of the allocation of the set of resource block groups in a second disjoint portion of the other of the uplink bandwidth or the downlink bandwidth.

In a sixth aspect, alone or in combination with one or more of the first through fifth aspects, each resource block group, of the plurality of resource block groups, is associated with a common size.

In a seventh aspect, alone or in combination with one or more of the first through sixth aspects, process 800 includes determining the common size based at least in part on a size of a first disjoint portion of the other of the uplink bandwidth or the downlink bandwidth or a size of a second disjoint portion of the other of the uplink bandwidth or the downlink bandwidth.

In an eighth aspect, alone or in combination with one or more of the first through seventh aspects, a first one or more resource block groups, of the plurality of resource block groups, is associated with a first size and a second one or more resource block groups, of the plurality of resource block groups, is associated with a second size that is different from the first size.

In a ninth aspect, alone or in combination with one or more of the first through eighth aspects, process 800 includes determining at least one of the first size or the second size based at least in part on a resource block group size table.

In a tenth aspect, alone or in combination with one or more of the first through ninth aspects, process 800 includes determining at least one of the first size or the second size based at least in part on at least one stored bandwidth part configuration.

In an eleventh aspect, alone or in combination with one or more of the first through tenth aspects, process 800 includes determining at least one of the first size or the second size based at least in part on a resource block group size table that includes a non-full duplex operation or non-disjoint bandwidth part operation configuration and a full-duplex operation or disjoint bandwidth part operation configuration.

In a twelfth aspect, alone or in combination with one or more of the first through eleventh aspects, process 800 includes determining at least one of the first size or the second size based at least in part on a resource block group size table that includes a full-duplex operation or disjoint bandwidth part operation configuration and not a non-full duplex operation or non-disjoint bandwidth part operation configuration.

In a thirteenth aspect, alone or in combination with one or more of the first through twelfth aspects, the frequency domain resource assignment indicator includes at least one of a start indicator or a length indicator identifying the allocation of the set of resource block groups.

In a fourteenth aspect, alone or in combination with one or more of the first through thirteenth aspects, the start indicator indicates that a start of the set of resource block groups is in a first disjoint portion of the other of the uplink bandwidth or the downlink bandwidth and the length indicator indicates that an end of the set of resource block groups is in a second disjoint portion of the other of the uplink bandwidth or the downlink bandwidth, and the set of resource block groups includes a first subset of the set of resource block groups from the start indicated by the start indicator to an end of the first disjoint portion and a second subset of the set of resource block groups from a start of the second disjoint portion to the end indicated by the length indicator.

In a fifteenth aspect, alone or in combination with one or more of the first through fourteenth aspects, a start, of the set of resource block groups, indicated by the start indicator and an end, of the set of resource block groups, indicated by the length indicator are both in one of a first disjoint portion of the other of the uplink bandwidth or the downlink bandwidth or a second disjoint portion of the other of the uplink bandwidth or the downlink bandwidth, and the set of resource block groups is contiguous from the start indicated by the start indicator to the end indicated by the length indicator.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
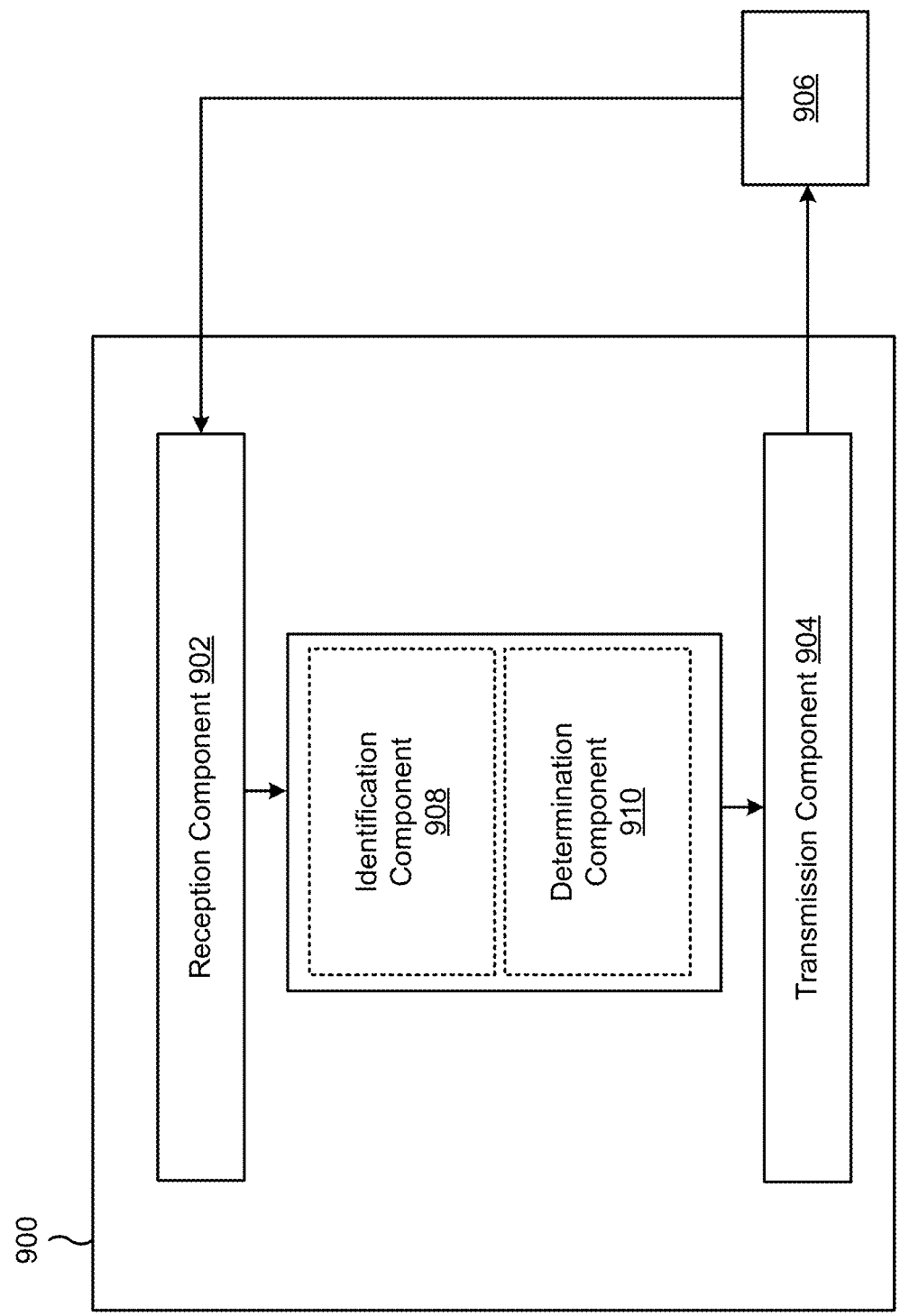
FIG. 9 is a block diagram of an example apparatus for wireless communication, in accordance with the present disclosure.

FIG. 9 is a block diagram of an example apparatus 900 for wireless communication. The apparatus 900 may be a wireless node, or a wireless node may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of an identification component 908 or a determination component 910, among other examples.

In some aspects, the apparatus 900 may be configured to perform one or more operations described herein in connection with FIG. 7. Additionally, or alternatively, the apparatus 900 may be configured to perform one or more processes described herein, such as process 800 of FIG. 8. In some aspects, the apparatus 900 and/or one or more components shown in FIG. 9 may include one or more components of the UE or BS described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE or BS described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE or BS described above in connection with FIG. 2. In some aspects, the transmission component 904 may be co-located with the reception component 902 in a transceiver.

The reception component 902 may receive a frequency domain resource assignment indicator identifying an allocation of a set of resource block groups of a plurality of resource block groups in a bandwidth part wherein the bandwidth part includes a plurality of disjoint portions of the bandwidth part and the plurality of disjoint portions comprise an uplink bandwidth or a downlink bandwidth separated by another portion of the bandwidth part. The identification component 908 may identify, based at least in part on the frequency domain resource assignment indicator, the allocation of the set of resource block groups. The reception component 902 or the transmission component 904 may communicate using the allocation of the set of resource block groups based at least in part on identifying the allocation of the set of resource block groups.

The determination component 910 may determine the common size based at least in part on a size of a first disjoint portion of the other of an uplink bandwidth or a downlink bandwidth or a size of a second disjoint portion of the other of the uplink bandwidth or the downlink bandwidth.

The determination component 910 may determine at least one of the first size or the second size based at least in part on a resource block group size table.

The determination component 910 may determine at least one of the first size or the second size based at least in part on at least one stored bandwidth part configuration.

The determination component 910 may determine at least one of the first size or the second size based at least in part on a resource block group size table that includes a non-full duplex operation or non-disjoint bandwidth part operation configuration and a full-duplex operation or disjoint bandwidth part operation configuration.

The determination component 910 may determine at least one of the first size or the second size based at least in part on a resource block group size table that includes a full-duplex operation or disjoint bandwidth part operation configuration and not a non-full duplex operation or non-disjoint bandwidth part operation configuration.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The foregoing disclosure provides illustration and description, but is not intended to be exhaustive or to limit the aspects to the precise forms disclosed. Modifications and variations may be made in light of the above disclosure or may be acquired from practice of the aspects.

The following provides an overview of some Aspects of the present disclosure:

Aspect 1: A method of wireless communication performed by a wireless node, comprising: receiving a frequency domain resource assignment indicator identifying an allocation of a set of resource block groups of a plurality of resource block groups in a bandwidth part, wherein the bandwidth part includes a plurality of disjoint portions of the bandwidth part and the plurality of disjoint portions comprise an uplink bandwidth or a downlink bandwidth separated by another portion of the bandwidth part; identifying, based at least in part on the frequency domain resource assignment indicator, the allocation of the set of resource block groups; and communicating using the allocation of the set of resource block groups based at least in part on identifying the allocation of the set of resource block groups.

Aspect 2: The method of Aspect 1, wherein the bandwidth part includes an uplink bandwidth and a downlink bandwidth.

Aspect 3: The method of any of Aspects 1 to 2, wherein the frequency domain resource assignment indicator includes a bit map identifying the allocation of the set of resource block groups.

Aspect 4: The method of Aspect 3, wherein each bit of the bit map corresponds to a resource block group of the plurality of resource block groups.

Aspect 5: The method of any of Aspects 3 to 4, wherein the frequency domain resource assignment indicator includes a break point identifier dividing the bit map into a first subset of bits of the bit map and a second subset of bits of the bit map, and wherein the first subset of bits corresponds to a first subset of the plurality of resource block groups in a first disjoint portion of the other of an uplink bandwidth or a downlink bandwidth and the second subset of bits of the bit map corresponds to a second subset of the plurality of resource block groups in a second disjoint portion of the other of the uplink bandwidth or the downlink bandwidth.

Aspect 6: The method of any of Aspects 1 to 5, wherein the frequency domain resource assignment indicator includes a first bit map identifying a first portion of the allocation of the set of resource block groups in a first disjoint portion of the other of an uplink bandwidth or a downlink bandwidth and a second bit map identifying a second portion of the allocation of the set of resource block groups in a second disjoint portion of the other of the uplink bandwidth or the downlink bandwidth.

Aspect 7: The method of any of Aspects 1 to 6, wherein each resource block group, of the plurality of resource block groups, is associated with a common size.

Aspect 8: The method of Aspect 7, further comprising: determining the common size based at least in part on a size of a first disjoint portion of the other of an uplink bandwidth or a downlink bandwidth or a size of a second disjoint portion of the other of the uplink bandwidth or the downlink bandwidth.

Aspect 9: The method of any of Aspects 1 to 8, wherein a first one or more resource block groups, of the plurality of resource block groups, is associated with a first size and a second one or more resource block groups, of the plurality of resource block groups, is associated with a second size that is different from the first size.

Aspect 10: The method of Aspect 9, further comprising: determining at least one of the first size or the second size based at least in part on a resource block group size table.

Aspect 11: The method of any of Aspects 9 to 10, further comprising: determining at least one of the first size or the second size based at least in part on at least one stored bandwidth part configuration.

Aspect 12: The method of any of Aspects 9 to 11, further comprising: determining at least one of the first size or the second size based at least in part on a resource block group size table that includes a non-full duplex operation or non-disjoint bandwidth part operation configuration and a full-duplex operation or disjoint bandwidth part operation configuration.

Aspect 13: The method of any of Aspects 9 to 12, further comprising: determining at least one of the first size or the second size based at least in part on a resource block group size table that includes a full-duplex operation or disjoint bandwidth part operation configuration and not a non-full duplex operation or non-disjoint bandwidth part operation configuration.

Aspect 14: The method of any of Aspects 1 to 13, wherein the frequency domain resource assignment indicator includes at least one of a start indicator or a length indicator identifying the allocation of the set of resource block groups.

Aspect 15: The method of Aspect 14, wherein the start indicator indicates that a start of the set of resource block groups is in a first disjoint portion of the other of an uplink bandwidth or a downlink bandwidth and the length indicator indicates that an end of the set of resource block groups is in a second disjoint portion of the other of the uplink bandwidth or the downlink bandwidth, and wherein the set of resource block groups includes a first subset of the set of resource block groups from the start indicated by the start indicator to an end of the first disjoint portion and a second subset of the set of resource block groups from a start of the second disjoint portion to the end indicated by the length indicator.

Aspect 16: The method of any of Aspects 14 to 15, wherein a start, of the set of resource block groups, indicated by the start indicator and an end, of the set of resource block groups, indicated by the length indicator are both in one of a first disjoint portion of the other of an uplink bandwidth or a downlink bandwidth or a second disjoint portion of the other of the uplink bandwidth or the downlink bandwidth; and wherein the set of resource block groups is contiguous from the start indicated by the start indicator to the end indicated by the length indicator.

Aspect 17: An apparatus for wireless communication at a device, comprising a processor; memory coupled with the processor; and instructions stored in the memory and executable by the processor to cause the apparatus to perform the method of one or more of Aspects 1-16.

Aspect 18: A device for wireless communication, comprising a memory and one or more processors coupled to the memory, the memory and the one or more processors configured to perform the method of one or more of Aspects 1-16.

Aspect 19: An apparatus for wireless communication, comprising at least one means for performing the method of one or more of Aspects 1-16.

Aspect 20: A non-transitory computer-readable medium storing code for wireless communication, the code comprising instructions executable by a processor to perform the method of one or more of Aspects 1-16.

Aspect 21: A non-transitory computer-readable medium storing a set of instructions for wireless communication, the set of instructions comprising one or more instructions that, when executed by one or more processors of a device, cause the device to perform the method of one or more of Aspects 1-16.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a wireless node, comprising:
receiving a frequency domain resource assignment indicator identifying a disjoint allocation of a set of resource block groups in a plurality of disjoint portions of a bandwidth part, the plurality of disjoint portions comprising an uplink bandwidth or a downlink bandwidth separated by another portion of the bandwidth part,
wherein the bandwidth part is active based at least in part on a bandwidth part configuration and is a full-duplex bandwidth part including an uplink bandwidth and a downlink bandwidth;
identifying, based at least in part on the frequency domain resource assignment indicator, the disjoint allocation of the set of resource block groups; and
communicating using the disjoint allocation of the set of resource block groups based at least in part on identifying the disjoint allocation of the set of resource block groups.

2. The method of claim 1, wherein the frequency domain resource assignment indicator includes a bit map identifying the disjoint allocation of the set of resource block groups.

3. The method of claim 2, wherein each bit of the bit map corresponds to a resource block group of a plurality of resource block groups of the bandwidth part.

4. The method of claim 2, wherein the frequency domain resource assignment indicator includes a break point identifier dividing the bit map into a first subset of bits of the bit map and a second subset of bits of the bit map, and
wherein the first subset of bits corresponds to a first subset of a plurality of resource block groups of the bandwidth part in a first disjoint portion of the other of an uplink bandwidth or a downlink bandwidth and the second subset of bits of the bit map corresponds to a second subset of the plurality of resource block groups in a second disjoint portion of the other of the uplink bandwidth or the downlink bandwidth.

5. The method of claim 1, wherein the frequency domain resource assignment indicator includes a first bit map identifying a first portion of the disjoint allocation of the set of resource block groups in a first disjoint portion of the other of an uplink bandwidth or a downlink bandwidth and a second bit map identifying a second portion of the disjoint allocation of the set of resource block groups in a second disjoint portion of the other of the uplink bandwidth or the downlink bandwidth.

6. The method of claim 1, wherein each resource block group, of a plurality of resource block groups of the bandwidth part, is associated with a common size.

7. The method of claim 6, further comprising:
determining the common size based at least in part on a size of a first disjoint portion of the other of an uplink bandwidth or a downlink bandwidth or a size of a second disjoint portion of the other of the uplink bandwidth or the downlink bandwidth.

8. The method of claim 1, wherein a first one or more resource block groups, of a plurality of resource block groups of the bandwidth part, is associated with a first size and a second one or more resource block groups, of the plurality of resource block groups, is associated with a second size that is different from the first size.

9. The method of claim 8, further comprising:
determining at least one of the first size or the second size based at least in part on a resource block group size table.

10. The method of claim 8, further comprising:
determining at least one of the first size or the second size based at least in part on at least one stored bandwidth part configuration.

11. The method of claim 8, further comprising:
determining at least one of the first size or the second size based at least in part on a resource block group size table that includes a non-full duplex operation or non-disjoint bandwidth part operation configuration and a full-duplex operation or disjoint bandwidth part operation configuration.

12. The method of claim 8, further comprising:
determining at least one of the first size or the second size based at least in part on a resource block group size table that includes a full-duplex operation or disjoint bandwidth part operation configuration and not a non-full duplex operation or non-disjoint bandwidth part operation configuration.

13. The method of claim 1, wherein the frequency domain resource assignment indicator includes at least one of a start indicator or a length indicator identifying the disjoint allocation of the set of resource block groups.

14. The method of claim 13, wherein the start indicator indicates that a start of the set of resource block groups is in a first disjoint portion of the other of an uplink bandwidth or a downlink bandwidth and the length indicator indicates that an end of the set of resource block groups is in a second disjoint portion of the other of the uplink bandwidth or the downlink bandwidth, and
wherein the set of resource block groups includes a first subset of the set of resource block groups from the start indicated by the start indicator to an end of the first disjoint portion and a second subset of the set of resource block groups from a start of the second disjoint portion to the end indicated by the length indicator.

15. The method of claim 13, wherein a start, of the set of resource block groups, indicated by the start indicator and an end, of the set of resource block groups, indicated by the length indicator are both in one of a first disjoint portion of the other of an uplink bandwidth or a downlink bandwidth or a second disjoint portion of the other of the uplink bandwidth or the downlink bandwidth; and
wherein the set of resource block groups is contiguous from the start indicated by the start indicator to the end indicated by the length indicator.

16. A wireless node for wireless communication, comprising:
a memory; and
one or more processors, coupled to the memory, configured to:
receive a frequency domain resource assignment indicator identifying a disjoint allocation of a set of resource block groups in a plurality of disjoint portions of a bandwidth part, the plurality of disjoint portions comprising an uplink bandwidth or a downlink bandwidth separated by another portion of the bandwidth part,
wherein the bandwidth part is active based at least in part on a bandwidth part configuration and is a full-duplex bandwidth part including an uplink bandwidth and a downlink bandwidth;
identify, based at least in part on the frequency domain resource assignment indicator, the disjoint allocation of the set of resource block groups; and
communicate using the disjoint allocation of the set of resource block groups based at least in part on identifying the disjoint allocation of the set of resource block groups.

17. The wireless node of claim 16, wherein the frequency domain resource assignment indicator includes a bit map identifying the disjoint allocation of the set of resource block groups.

18. The wireless node of claim 17, wherein each bit of the bit map corresponds to a resource block group of a plurality of resource block groups of the bandwidth part.

19. The wireless node of claim 17, wherein the frequency domain resource assignment indicator includes a break point identifier dividing the bit map into a first subset of bits of the bit map and a second subset of bits of the bit map, and
wherein the first subset of bits corresponds to a first subset of a plurality of resource block groups of the bandwidth part in a first disjoint portion of the other of an uplink bandwidth or a downlink bandwidth and the second subset of bits of the bit map corresponds to a second subset of the plurality of resource block groups in a second disjoint portion of the other of the uplink bandwidth or the downlink bandwidth.

20. The wireless node of claim 16, wherein the frequency domain resource assignment indicator includes a first bit map identifying a first portion of the disjoint allocation of the set of resource block groups in a first disjoint portion of the other of an uplink bandwidth or a downlink bandwidth and a second bit map identifying a second portion of the disjoint allocation of the set of resource block groups in a second disjoint portion of the other of the uplink bandwidth or the downlink bandwidth.

21. The wireless node of claim 16, wherein each resource block group, of a plurality of resource block groups of the bandwidth part, is associated with a common size.

22. The wireless node of claim 21, wherein the one or more processors are further configured to:
determine the common size based at least in part on a size of a first disjoint portion of the other of an uplink bandwidth or a downlink bandwidth or a size of a second disjoint portion of the other of the uplink bandwidth or the downlink bandwidth.

23. The wireless node of claim 16, wherein a first one or more resource block groups, of a plurality of resource block groups of the bandwidth part, is associated with a first size and a second one or more resource block groups, of the plurality of resource block groups, is associated with a second size that is different from the first size.

24. The wireless node of claim 23, wherein the one or more processors are further configured to:
determine at least one of the first size or the second size based at least in part on a resource block group size table.

25. The wireless node of claim 23, wherein the one or more processors are further configured to:
determine at least one of the first size or the second size based at least in part on at least one stored bandwidth part configuration.

26. The wireless node of claim 23, wherein the one or more processors are further configured to:
determine at least one of the first size or the second size based at least in part on a resource block group size table that includes a non-full duplex operation or non-disjoint bandwidth part operation configuration and a full-duplex operation or disjoint bandwidth part operation configuration.

27. A non-transitory computer-readable medium storing a set of instructions for wireless communication, the set of instructions comprising:
one or more instructions that, when executed by one or more processors of a wireless node, cause the wireless node to:
receive a frequency domain resource assignment indicator identifying a disjoint allocation of a set of resource block groups in a plurality of disjoint portions of a bandwidth part, the plurality of disjoint portions comprising an uplink bandwidth or a downlink bandwidth separated by another portion of the bandwidth part,
 wherein the bandwidth part is active based at least in part on a bandwidth part configuration and is a full-duplex bandwidth part including an uplink bandwidth and a downlink bandwidth;
 identify, based at least in part on the frequency domain resource assignment indicator, the disjoint allocation of the set of resource block groups; and
 communicate using the disjoint allocation of the set of resource block groups based at least in part on identifying the disjoint allocation of the set of resource block groups.

28. The non-transitory computer-readable medium of claim 27, wherein the frequency domain resource assignment indicator includes a bit map identifying the disjoint allocation of the set of resource block groups.

29. The non-transitory computer-readable medium of claim 27, wherein the frequency domain resource assignment indicator includes at least one of a start indicator or a length indicator identifying the disjoint allocation of the set of resource block groups.

30. An apparatus for wireless communication, comprising:
 means for receiving a frequency domain resource assignment indicator identifying a disjoint allocation of a set of resource block groups in a plurality of disjoint portions of a bandwidth part, the plurality of disjoint portions comprising an uplink bandwidth or a downlink bandwidth separated by another portion of the bandwidth part,
 wherein the bandwidth part is active based at least in part on a bandwidth part configuration and is a full-duplex bandwidth part including an uplink bandwidth and a downlink bandwidth;
 means for identifying, based at least in part on the frequency domain resource assignment indicator, the disjoint allocation of the set of resource block groups; and
 means for communicating using the disjoint allocation of the set of resource block groups based at least in part on identifying the disjoint allocation of the set of resource block groups.

* * * * *